United States Patent [19]

Rhodes

[11] 4,084,577
[45] Apr. 18, 1978

[54] SOLAR RADIATION CONVERTING METHOD AND MEANS

[76] Inventor: William A. Rhodes, 4421 N. 13th Pl., Phoenix, Ariz. 85014

[21] Appl. No.: 716,247

[22] Filed: Aug. 20, 1976

Related U.S. Application Data

[63] Continuation-in-part of Ser. No. 710,278, Jul. 30, 1976, abandoned.

[51] Int. Cl.² .............................................. F24J 3/02
[52] U.S. Cl. .................................. 126/270; 126/271; 350/312
[58] Field of Search .................. 126/270, 271, 400; 350/1, 267, 312

[56] References Cited

U.S. PATENT DOCUMENTS

2,595,905   5/1952   Telkes ................................... 126/270
3,914,010   10/1975  Zeller .................................... 350/312

OTHER PUBLICATIONS

Ingersoll, "Applied Optics," vol. 10, No. 12, Dec. 1971, pp. 2781-2783.
Devlin, et al., Applied Physics Letters, vol. 19, No. 5, Sept. 1971, pp. 138-141.

Primary Examiner—Kenneth W. Sprague
Assistant Examiner—Larry Jones
Attorney, Agent, or Firm—William H. Dean; Don J. Flickinger; John A. Robertson

[57] ABSTRACT

The disclosure relates to a solar radiation converting method and means whereby the addition of a halogen within a hermetically sealed spaced receives and converts solar or synthetic radiant spectra into heat energy; its principal advantage being the conversion of the visible portion of the light spectra into additional heat.

12 Claims, 1 Drawing Figure

U.S. Patent  April 18, 1978  4,084,577
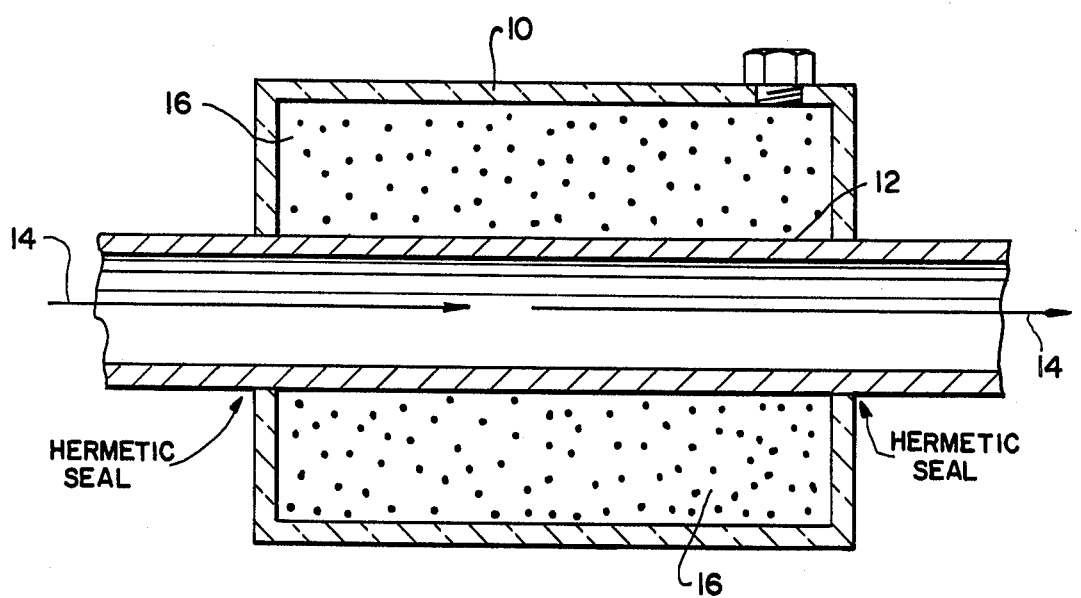

SOLAR RADIATION CONVERTING METHOD AND MEANS

This application is a continuation-in-part of a co-pending application of William A. Rhodes, Ser. No. 710,278, July 30, 1976 for a Solar Radiation Converting Method and Means now abandoned.

BACKGROUND OF THE INVENTION

Prior art for conversion of solar energy to heat usually comprises a flat plate collector wherein fluids or gases are circulated to carry away the heat energy thus received. In the past, such collectors have been painted black and others have been coated with selective surfaces to increase ability to absorb as much radiation as possible and attempt to prevent re-radiation into space. All such devices suffer because they are capable of absorbing only the near and far infrared leaving much of the visible spectrum unavailable for heat production.

SUMMARY OF THE INVENTION

When searching for a solar absorber the best possible absorber has the highest absorptivity and the lower emissivity. Spectroscopy has shown that iodine and bromine in either the gaseous or liquid phases exhibit strong absorption in the visible spectrum and very little emission in the infrared. It also appears the other halogens, chlorine and flourine are inadequate for this purpose because of lack of sufficient density when in suspension as compared to iodine and bromine.

My invention preferably utilizes a halogen such as iodine or bromine introduced within a sealed enclosure space between a light transparent cover of a solar collector and its heat collecting elements to convert visisble radiation entering said space into additional heat energy along with the normal low frequencies of the infrared which pass unconverted through the halogenated space.

The method utilized to determine that actual frequency conversion has occurred was the use of high efficiency filters admitting the near-to-far infrared but blocking all spectra of the visible light frequencies. such filters were interposed between the test cavity containing a halogen and solar radiation. During such interposition which prevented the visible spectra from reaching the halogen test cavity, space temperature fell within the cavity and became the same as the control cavity containing only atmosphere and exposed to sunlight, minus the temperature allowed for the additional surfaces of the filter.

When such filter was interposed between the control cavity with plain atmosphere, temperature reduction of a few degrees indicated that the additional filter surfaces were responsible. Most important is the observation that when simultaneous placement of these filters over both control and halogenated cavities, observed temperatures were within two degrees of each other, both being under 120° F. The same tests with bromine were found to respond the same.

It was thus deduced that the halogen within the cavities does indeed convert visible light spectra into heat energy. Further, vaporization of either halogen is automatic upon exposure to solar radiation and is enhanced by the additional heat thus derived.

Accordingly, one object of this invention is to provide for an increase of solar radiation efficiency upon any solar receiver.

Another object is to provide for such increased efficiency upon any receiver of light radiation and from whatever source of such radiation.

Another object is to provide for conversion of visible light spectra into heat for any purpose thereof.

BRIEF DESCRIPTION OF THE DRAWINGS

The FIGURE of the drawing is a sectional view of the means of the invention.

DESCRIPTION OF THE PREFERRED EMBODIMENTS

As shown in the FIGURE of the drawing, a light transparent hollow housing 10 as will be hereinafter described surrounds a hollow heat exchange means 12, which, for example, only is tubular and may conduct liquid or gas to receive heat therefrom which gas or liquid may flow therethrough as indicated by arrows 14. A halogen element 16, such as iodine, bromine, chlorine or flourine, the preferred elements being iodine and bromine, is disposed and hermetically sealed in the housing 10.

In the gaseious phase, tests near the solar Langley level of 700 provides a cavity of glass with air only, with a temperature of 120° F. For an identical space volume and Langley level, another cavity of glass saturated with water vapor reached a temperature of 123° F. For another identical cavity and Langley level but with iodine vapor saturating the space, a temperature of 140° F. was reached. The temperature with bromine was 145° F.

Liquid phase test were likewise performed. Iodine dissolved in carbon tetrachloride and bromine dissolved in water each show the same marked temperature increases due to identical phenomena observed in the gaseous state. Practical application of these two halogens in the liquid phase is evident since heat transfer is made through direct contact with the energy extraction surface. Such temperature elevations were not observed in metallic colloidal suspensions of approximately the same light flux density.

With the addition of a halogen, flat plate solar collector panels with or without a selective radiation surface gain not only an advantage of smaller dimensions for a given heat demand, but also are more desirable economically. Halogen activation of such collector enclosures 10 is accomplished merely by introducing one of the two halogens 16 mentioned within the confinement. To prevent metallic surfaces from being attacked by the halogen, the enclosure 10 must first be flushed out with a dry gas, such as nitrogen or any other, which will not react with the halogen. The same procedure of avoiding moisture should follow the same techniques as are found in freon refrigeration equipment. It is also advisable to use glass for the transparent media because plastic material will usually absorb such halogen, discolor and eventually fail altogether.

Ideally, in the case iodine has been chosen, it must be introduced so as to be exposed to the incoming radiation. It matters not whether it is in a pile or scattered. Iodine vapor will create a small static pressure and it has been found so insignificant that little, if any, precaution needs to be taken for glass protection. The cavity must be hermetically sealed however, since iodine loss would be considerable over a period of time. It has also been found that the amount of iodine chosen for the particular cavity is sufficient when a few iodine crystals can be seen forming on the underside of the glass surface. If no crystals form, then there might be a chance of iodine insufficiency and if the undersurface becomes too coated with crystals, incoming radiation can be blocked and efficiency will be rapidly reduced. A good practice of curing oversupply is to leave a vent open and in the sun the crystal formations will gradually subside as the gas vents to atmosphere, then the chamber can be sealed. Generally, the quantity of halogen per square yard, depending upon depth of cavity, need be no more than a few grams.

Further experimentation utilizing both iodine and bromine were conducted within a glass cavity. Quantities of each were in excess allowing each element to vaporize to its equilibrium within the other. Under similar Langley flux a temperature of 156° F. was reached, indicating an advantage over the use of either halogen alone.

Using a 2 liter Dewar flask with transparent cover and thermometer inside, air alone provided 197° F., iodine vapor alone 230° F., bromine alone 237° F. and a combination of iodine and bromine vapors together 256° F..

Due to these above observations, it is believed that such combination of halogens enhance entrapment of visible spectra and their conversion to heat energy. It is also believed that in the case of one halogen alone or its combination with others of its class, there exists a relationship between halogen vapor density versus the depth which the radiation spectra must penetrate to provide optimum absorption and conversion of visible spectra to infrared heat energy.

Subsequent tests indicate this postulation may be true, however ratios of halogen's density versus depth has yet to be established.

As a further consequence of my research, I find it may be feasible to take advantage of these halogen systems by confining them for example within a closed loop circulating system; using convection or magnetically coupled pump to transfer a solar heated halogenated liquid or gas to and from any device capable of utilizing such elevated heat energy.

Since halogenated water would be corrosive toward most common structure metals I have found that such halogens dispersed in some solvents will not corrode most metals. For example, carbon tetrachloride and toluene will function with iodine in solution and not be corrosive toward aluminum and iron, however bromine in toluene loses colar due to chemical raction and becomes ineffective as a converter of visible light.

On the other hand, carbon tetrachloride is only one of a group of solvents which does not exhibit such loss of coloration with either or both halogens in suspension. With this liquid system there appears to be no attack whatsoever on such metals as aluminum, iron and others. For so long as water vapor is excluded, it appears likely these metals and others would make excellent containers for flat plate collector systems using such media.

With such fluid media it is believed that direct circulation of same for heat extraction at a position remove from the collector is possible.

A series of test using various densities of colloidal metal suspensions, such as gold or silver colloids exhibit little advantage over ordinary water which is probably due to their high re-radiation factor in the infrared.

I claim:

1. A method whereby a halogen is introduced in fluid suspension into a hermetically sealed light transmitting enclosure; said enclosure being exposed to radiant light energy; said radiation passing through a surface sealing said enclosure; then into a halogen in suspension in said enclosure; said halogen to transmit infrared heat energy onto a receiving surface wherein said heat is extracted for use; said halogen intercepts and converts visible light spectra into infrared heat energy which likewise impinges upon said receiving surface thereby to increase the available heat energy over and above the amount received from the usual infrared radiation of the spectra.

2. The invention as defined in claim 1, wherein: the halogen is iodine.

3. The invention as defined in claim 1, wherein: the halogen is bromine.

4. the invention as defined in claim 1, wherein: the fluid media is a gas.

5. The invention as defined in claim 1, wherein: the fluid media is a liquid.

6. The invention as defined in claim 1, wherein: the fluid media is in gaseous form; said gas being conducted away from its radiation receiving location and into a remote location wherefrom heat energy is extracted; said gas being returned for absorption and re-radiation, to repeat in continuous cycle.

7. The invention as defined in claim 6, wherein: the fluid media being a liquid.

8. A means for converting visible light spectra into infrared heat energy comprising: a first light transparent housing means; a second means for extracting heat energy arriving through and from said first means; a space separating said first and second means; said first and second means hermetically sealing said space therebetween from the outside atmosphere; a halogen means fluidly dispersed within said space so when radiant light energy is caused to pass through said first means, the visible portion of said radiant light energy is intercepted by said halogen means within said space wherein its frequencies are converted from the visible spectrum to infrared heat energy to increase thereby the amount of energy available from second said means; original infrared radiation arriving through said first light transparent means to pass without frequency conversion and transfer to said second means for extraction of the sum total of all arriving frequencies within said space in the form of heat energy.

9. A method whereby a plurality of halogens are introduced into a hermetically sealed light transparent enclosure; said enclosure being exposed to radiant light energy; said radiation passing through a surface sealing said enclosure; then into and through a plurality of halogens in suspension within said enclosure; said halogens to transmit arriving infrared energy onto a receiving surface from where said heat is extracted for use; and said plurality of halogens intercepting and converging visible light spectra into infrared heat energy which likewise impinges upon said receiving surface thereby to increase the available heat energy over and above the amount received from the usual infrared radiation of the spectra.

10. The invention as defined in claim 9, wherein: the fluid media is a gas.

11. The invention as defined in claim 9, wherein: the fluid media is a liquid.

12. A method whereby the halogens, iodine and bromine are dispersed as molecular constituents in suspension within an hermetically sealed enclosure; radiant light energy passing through a transparent surface sealing said enclosure; said halogens to transmit therethrough, arriving infrared heat energy onto a receiving surface from where said heat energy is extracted for use; and said halogens intercepting and converting visible light spectra into heat energy which likewise impinges upon said receiving surface thereby to increase the available heat energy over and above the amount received from the usual infrared radiation of the spectra.

* * * * *